United States Patent
Helmreich et al.

(10) Patent No.: US 11,400,840 B2
(45) Date of Patent: Aug. 2, 2022

(54) SYSTEM AND METHOD FOR SEAT VIBRATION CANCELLATION

(71) Applicant: STEERING SOLUTIONS IP HOLDING CORPORATION, Saginaw, MI (US)

(72) Inventors: Benjamin H. Helmreich, Bay City, MI (US); Brian G. Maust, Unionville, MI (US); Christopher R. Douglas, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 72 days.

(21) Appl. No.: 16/676,086

(22) Filed: Nov. 6, 2019

(65) Prior Publication Data

US 2021/0129719 A1    May 6, 2021

(51) Int. Cl.
*B60N 2/50*  (2006.01)
*B60N 2/68*  (2006.01)
*B60N 2/54*  (2006.01)

(52) U.S. Cl.
CPC .............. *B60N 2/501* (2013.01); *B60N 2/502* (2013.01); *B60N 2/505* (2013.01); *B60N 2/508* (2013.01); *B60N 2/54* (2013.01); *B60N 2/68* (2013.01); *B60N 2205/00* (2013.01)

(58) Field of Classification Search
CPC ........ B60N 5/501; B60N 2/502; B60N 2/505; B60N 5/508; B60N 2/522; B60N 2/68; B60N 2/90; B60N 2/54; B60N 2205/00; B60G 17/015; B60G 17/06; F16M 11/24
See application file for complete search history.

(56) References Cited

U.S. PATENT DOCUMENTS

| | | | | |
|---|---|---|---|---|
| 5,374,025 A * | 12/1994 | Whelpley | ............. | F16F 7/1017 188/378 |
| 5,520,375 A * | 5/1996 | Lei | .......................... | F16F 7/1011 188/378 |
| 5,794,911 A * | 8/1998 | Hill | ......................... | B60N 2/502 248/419 |
| 6,472,840 B1 * | 10/2002 | Takahashi | ............. | F16F 7/1005 318/611 |
| 2021/0129720 A1 * | 5/2021 | Maust | .................... | B60N 2/508 |
| 2021/0139107 A1 * | 5/2021 | Weber | ..................... | F16F 15/02 |

* cited by examiner

*Primary Examiner* — Tan Le
(74) *Attorney, Agent, or Firm* — Dickinson Wright PLLC

(57) ABSTRACT

A method for cancelling seat vibration includes receiving a first accelerometer measurement. The method also includes receiving a second accelerometer measurement. The method also includes determining a counter torque value based on the first accelerometer measurement and the second accelerometer measurement. The method also includes selectively controlling a motor using the counter torque value.

12 Claims, 4 Drawing Sheets

SYSTEM AND METHOD FOR SEAT VIBRATION CANCELLATION

TECHNICAL FIELD

This disclosure relates to seats and in particular to systems and methods for seat vibration cancellation.

BACKGROUND

Vehicles, such as cars, trucks, sport utility vehicles, crossovers, mini-vans, ride on industrial equipment (e.g., floor scrubbers, floor sweepers, forklifts, commercial lawnmowers, and the like), boats, airplanes, helicopters, and/or other suitable vehicles typically include a seat for an operator to sit on while operating the vehicle. During operation of such a vehicle, the operator may experience various vibrations while seated, resulting from various forces acting on the seat.

Typically, such a vehicle includes various strain reduction components adapted to reduce strain on the operator, which may allow the operator to operate the vehicle for longer periods, yielding a higher productive output. The various strain reduction components of the vehicle may include air bladders, mechanical shocks, and the like. The various strain reduction components of the vehicle may be adapted to isolate the operator from the various vibrations experienced while operating the vehicle.

SUMMARY

This disclosure relates generally to seat vibration cancellation.

An aspect of the disclosed embodiments includes a system for cancelling seat vibration. The system includes a motor in mechanical communication with a control arm. The system also includes a processor and a memory. The memory includes instructions that, when executed by the processor, cause the processor to: receive, from a first accelerometer, a first accelerometer measurement; receive, from a second accelerometer, a second accelerometer measurement; determine a counter torque value based on the first accelerometer measurement and the second accelerometer measurement; and selectively control the motor using the counter torque value.

Another aspect of the disclosed embodiments includes a method for cancelling seat vibration. The method includes receiving a first accelerometer measurement. The method also includes receiving a second accelerometer measurement. The method also includes determining a counter torque value based on the first accelerometer measurement and the second accelerometer measurement. The method also includes selectively controlling a motor using the counter torque value.

Another aspect of the disclosed embodiments includes a vehicle seat apparatus. The vehicle seat apparatus includes a brushless servo motor and a controller. The brushless servo motor is in mechanical communication with control arm, the control arm extends from a seat top plate to a base mount plate. The controller is configured to: receive, from a first accelerometer disposed on the seat top plate, a first accelerometer measurement; receive, from a second accelerometer disposed on the base mount plate, a second accelerometer measurement; determine a counter torque value based on the first accelerometer measurement and the second accelerometer measurement; and selectively control the brushless servo motor to apply a force corresponding to the counter torque value to the seat top plate using control arm.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
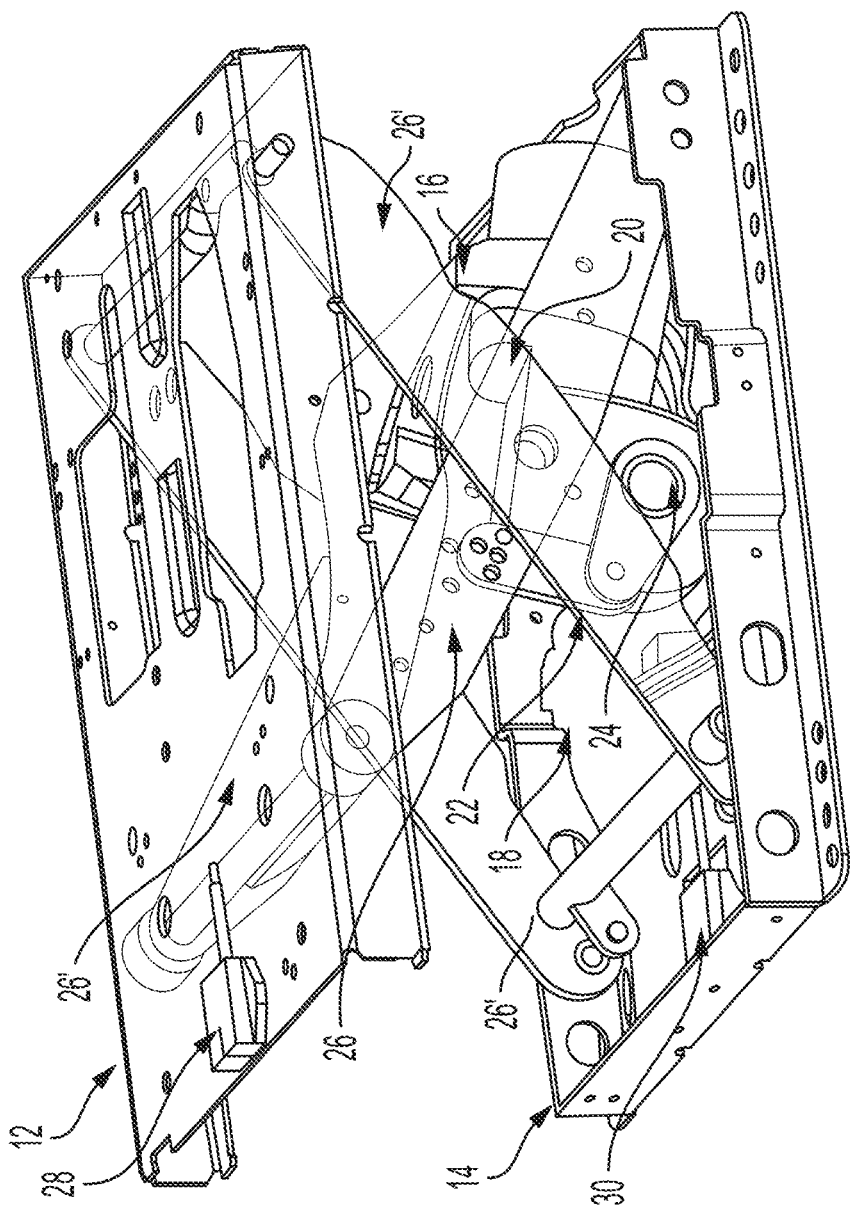
FIG. 1 generally illustrates a vibration cancellation system according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, ride on industrial equipment (e.g., floor scrubbers, floor sweepers, forklifts, commercial lawnmowers, and the like), boats, airplanes, helicopters, and/or other suitable vehicles typically include a seat for an operator to sit on while operating the vehicle. During operation of a vehicle, the operator may experience various vibrations while seated, resulting from various forces acting on the seat. For example, engine vibration and various forces exerted on the vehicle, such as those resulting from various characteristics of a path the vehicle is traversing, may cause various vibrations to act on the seat of the vehicle.

Typically, such a vehicle includes various strain reduction components adapted to reduce strain on the operator, which may allow the operator to operate the vehicle for longer periods, yielding a higher productive output. The various strain reduction components of vehicle may include air bladders, mechanical shocks, and the like. The various strain reduction components of the vehicle may be adapted to isolate the operator from the various vibrations experienced while operating the vehicle. The strain reduction components may provide operator comfort and may be an effective passive isolation of the vibration for the operator. However, such typical strain reduction components may not provide an active vibration cancellation and may increase manufacturing costs of typical vehicles.

Accordingly, systems and methods, such as those described herein, that are configured to provide both passive and active vibration cancellation, may be desirable. The systems and methods described herein may be configured to sense floor acceleration of a portion of the vehicle floor disposed proximate or beneath a seat. The systems and methods described herein may be configured to determine and provide cancellation forces to a seat top plate of the seat to control movement of the seat, prior to vibrations and other forces acting on the seat.

In some embodiments, the systems and methods described herein may be configured to provide an operator interface. The operator interface may include a selectable switch (e.g., such as a three position selector switch or other suitable selectable switch), a digital interface switch (e.g., such as on a display of the vehicle or other suitable display), or other suitable operator interface. In some embodiments, the systems and methods described herein may be configured to receive, from the operator interface, an operator preference (e.g., based on an operator selection). The operator preference may indicate a preferred operating mode. The operator modes may include a comfort mode, a medium mode, a firm mode, or other suitable mode. The systems and methods described herein may be configured to adjust the cancellation force provided to the seat top plate based on the operator preference (e.g., to provide a ride firmness selected by the operator).

In some embodiments, the systems and methods described herein may be configured to determine a motor position and a motor speed of a motor associated with the seat of the vehicle. The systems and methods described herein may be configured to determine an amount of torque to be applied, via the motor, to the seat top plate of the seat to reduce or eliminate a harsh mechanical stop impact. Torque may be determined based on the motor position and the motor speed. For example, the amount of torque may include a sum of the motor position and the motor speed, such that the amount of torque is delivered via the motor to the seat top plate in order to oppose the impact on the seat.

In some embodiments, the systems and methods described herein may be configured to receive, from a first accelerometer, a first accelerometer measurement. The systems and methods described herein may be configured to receive, from a second accelerometer, a second accelerometer measurement. The systems and methods described herein may be configured to determine a counter torque value based on the first accelerometer measurement and the second accelerometer measurement. The systems and methods described herein may be configured to selectively control the motor using the counter torque value.

In some embodiments of the systems and methods described herein, the motor may include a brushless servo motor or other suitable motor. In some embodiments of the systems and methods described herein, the first accelerometer is disposed on a seat top plate. In some embodiments of the systems and methods described herein, the second accelerometer is disposed on a base mount plate. In some embodiments of the systems and methods described herein, the control arm is adapted to apply a force corresponding to the counter torque value on a seat top plate. In some embodiments, the systems and methods described herein may be configured to selectively adjust the counter torque value based on an operator preference. In some embodiments of the systems and methods described herein, the operator preference corresponds to a desired ride style of an operator. In some embodiments, the systems and methods described herein may be configured to determine a motor position of the motor. In some embodiments, the systems and methods described herein may be configured to determine a motor speed of the motor. In some embodiments, the systems and methods described herein may be configured to selectively adjust the counter torque value based on the motor position and the motor speed.

FIG. 1 generally illustrates a vibration cancelation system 10 according to the principles of the present disclosure. The system 10 may be associated with a seat. The seat and/or the system 10 may be disposed with in a vehicle, such as those described herein. The system 10 may include a seat top plate 12 and a base mount plate 14. The seat top plate 12 may be configured to engage a bottom or lower portion of the seat. The base mount plate 14 may be configured to secure the system 10 and the seat to a portion of a floor of the vehicle.

The system 10 may include a motor 16 disposed on the base mount plate 14. It should be understood that the motor 16 may be disposed in any suitable location besides the base mount plate 14. The motor 16 may include any suitable motor. For example, the motor 16 may include a brushless servo motor or other suitable motor. The system 10 includes a controller 18. The controller 18 may be configured to selectively control the motor 16. For example, the controller 18, as will be described, may be configured to determine various torque values. The controller 18 may control the motor 16 using the determined torque values. For example, the controller 18 may instruct the motor 16 to turn at a speed corresponding to a determined torque value. The motor 16 may move in response to the instructions from the controller 18.

The motor 16 may be in mechanical communication with a gear box 20. The gear box 20 may include any suitable gear box, such as a worm gear box or other suitable gear box. As the motor 16 turns in response to the instructions from the controller 18, the gears within the gear box 20 actuate. The gear box 20 may include a plurality of gears having any suitable gear ratio. The gear box 20 may be configured to reduce rotational speed and increase torque provided by the motor 16. As the gears of the gear box 20 are actuated, a link arm 22 connected to the gear box 20 via lever arm 24 moves, which may cause a lift mechanism 26 to actuate.

The lift mechanism 26 may include one or more control arms 26'. In some embodiments, the control arms 26' may be arranged such that the lift mechanism 26 includes a scissor lift mechanism, however, the lift mechanism 26 may include any suitable lift mechanism. As the link arm 22 moves, the control arms 26' of the lift mechanism 26 apply a force on the seat top plate 12. The force applied by the control arms 26' of the lift mechanism 26 on the seat top plate 12 corresponds to the determined torque applied to the motor 16 by the controller 18.

In some embodiments, the system 10 includes an accelerometer 28 disposed on the seat top plate 12 and an accelerometer 30 disposed on the base mount plate 14. While only the accelerometer 28 and the accelerometer 30 are described, the system 10 may include any suitable number of accelerators, including fewer or additional accelerometers or sensors than those described herein. The accelerometer 28 and the accelerometer 30 may include any suitable accelerometer. The accelerometer 28 and the accelerometer 30 may be configured to measure acceleration forces acting on the seat top plate 12 and the base mount plate 14, respectively.

Figure 2:
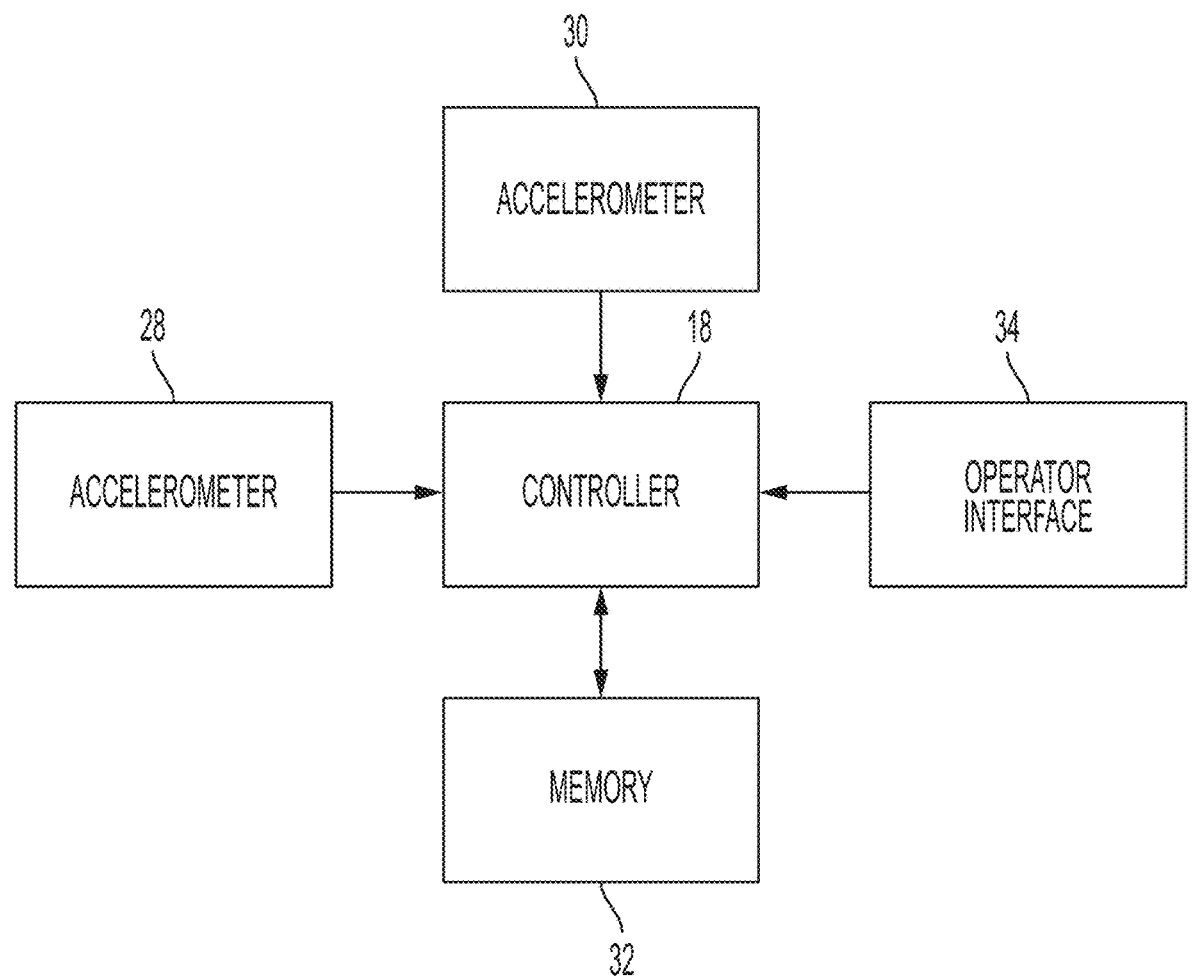
FIG. 2 generally illustrates vibration cancellation controller system according to the principles of the present disclosure.

As described, the system 10 includes the controller 18. The controller 18 may include any suitable controller or processor, such as those described herein. The controller 18 may be configured to executed instructions stored on a memory, such as the memory 32, as is generally illustrated in FIG. 2. The memory 32 may comprise a single disk or a plurality of disks (e.g., hard drives), and includes a storage management module that manages one or more partitions within the memory 32. In some embodiments, memory 32 may include flash memory, semiconductor (solid state) memory or the like. The memory 32 may include Random Access Memory (RAM), a Read-Only Memory (ROM), or a combination thereof.

The instructions stored on the memory 32, when executed by the controller 18, cause the controller 18 to, at least, control or cancel the perception by the operator of vibrations acting on the seat of the vehicle. For example, the controller 18 receives a first accelerometer measurement from the accelerometer 28 and a second accelerometer measurement from the accelerometer 30. The accelerometer measurements represent forces currently acting on the seat top plate 12 and the base mount plate 14, respectively. The controller 18 may be configured to determine a counter torque value based on the first accelerometer measurement and the second accelerometer measurement. The counter torque value corresponds to a torque value that, when the controller 18 controls the motor 16 using the counter torque value, generates a force that is opposite and same or substantially the same in magnitude as the vibrations acting on the seat top plate 12.

As described, the controller 18 controls the motor 16 according to the counter torque value. As the motor 16 turns according to the counter torque value, the gears of the gear box 20 actuate causing the link arm 22 to move. The control arms 26' move or actuate in response to the link arm 22 moving, which causes the lift mechanism 26 to exert a force that is opposite the vibrations acting on the seat top plate 12, which may reduce or cancel the perception by the operator of the vibrations acting on the seat top plate 12.

Figure 4:
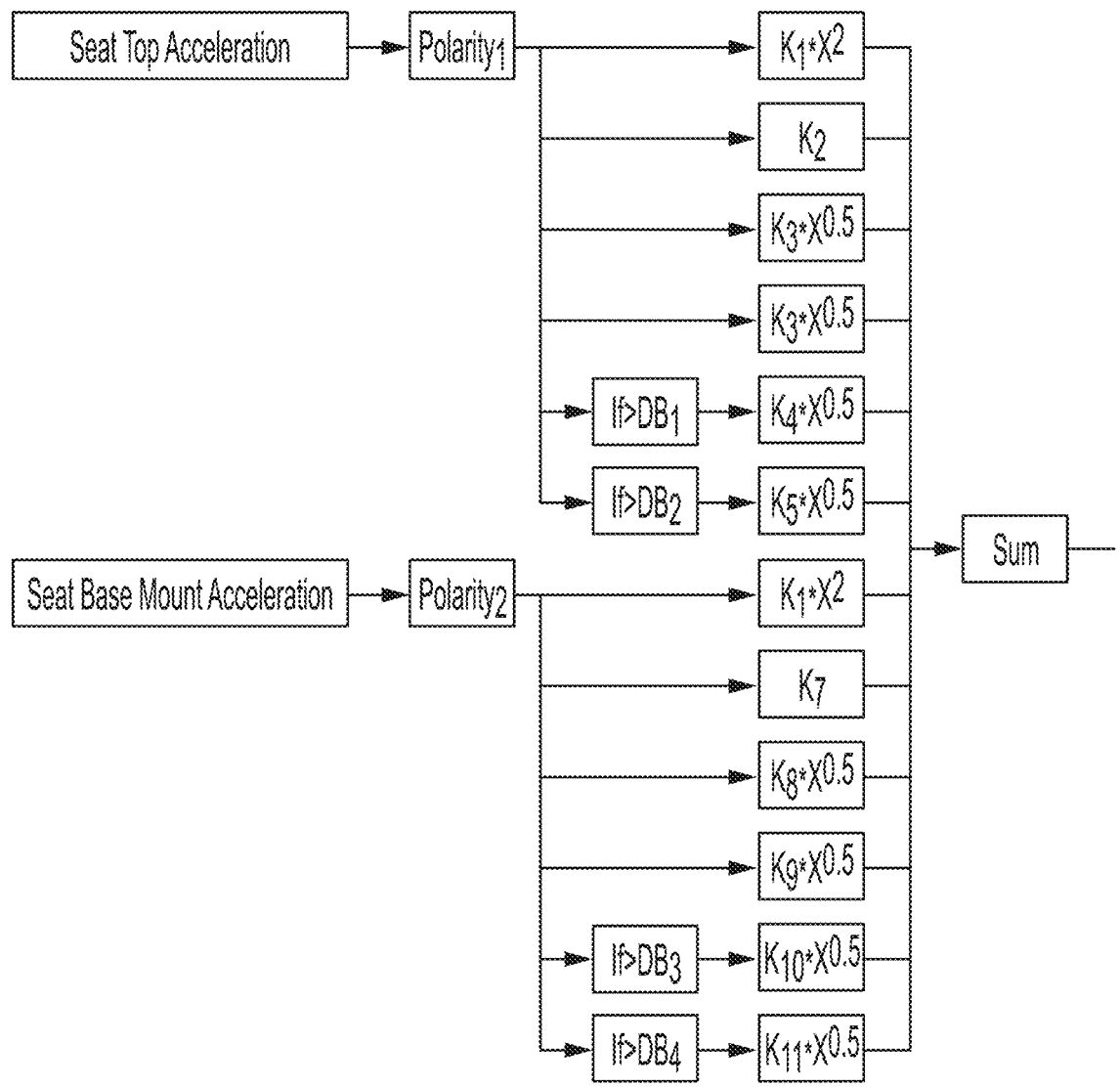
FIG. 4 generally illustrates a seat vibration cancellation algorithm according to the principles of the present disclosure.

In some embodiments, the controller 18 may determine the counter torque value according algorithm generally illustrated in FIG. 4.

Where X is an input variable, such as an accelerometer measurement, for each mathematical formula in the algorithm and K is a unique calibratable tuning constant defined for mathematical formula in the algorithm. In the above, each variable may be tunable and/or weighted. The controller 18 may determine the counter torque value based on a sum of the first accelerometer measurement and the second accelerometer measurement.

In some embodiments, the controller 18 may be in communication with an operator interface 34. The operator interface 34 may include any suitable interface. For example, the operator interface 34 may include a selectable switch (e.g., such as a three position selector switch or other suitable selectable switch), a digital interface switch (e.g., such as on a display of the vehicle, on a mobile device display, or other suitable display), or other suitable operator interface. The controller 18 may be configured to receive, an operator preference from the operator interface 34. The operator preference may indicate a preferred operating mode. For example, the operator of the vehicle may select a preferred or desired operating mode using the operator interface 34. The operator modes may include a comfort mode, a medium mode, a firm mode, or other suitable mode. The controller 18 may selectively adjust the counter torque value based on the operator preference. For example, the controller 18 may increase or decrease the counter torque value to provide more or less vibration cancellation based on the operator preference (e.g., to provide a riding experience through vibration cancellation that corresponds to the operator preference.

In some embodiments, the controller 18 may be configured to selectively adjust the counter torque value based on a motor position and a motor speed of the motor 16 in order to control or eliminate a harsh mechanical end stop impact on the seat (e.g., via the seat top plate 12). For example, the controller 18 may determine a motor position of the motor 16. The controller 18 may receive a motor position from a position sensor, or other suitable sensor, disposed proximate the motor 16 and configured to determine a motor position of the motor 16. The controller 18 may determine a motor speed of the motor 16. For example, the controller 18 may receive a motor speed from a velocity sensor, or other suitable sensor, disposed proximate the motor 16 and configured to determine a motor speed of the motor 16.

In some embodiments, the controller 18 converts the motor position into a normalized seat displacement value corresponding to a displacement of the seat range from −100% to +100%. The controller 18 determines a sum of the motor position and the motor speed. The controller 18 determines a torque value and/or selectively adjusts the counter torque value based on the sum of the motor position and the motor speed. The controller 18 controls the motor 16 using the determined torque value or the adjusted counter torque value to reduce or eliminate harsh mechanical end stop impact on the seat top plate 12.

In some embodiments, the controller 18 continues to monitor accelerometer measurements, motor position, and/or motor speed in order to provide continuous reduction or elimination of the perception by the operator of the vibrations acting on the seat via the seat top plate 12.

In some embodiments, the controller 18 may perform the methods described herein. However, the methods described herein as performed by controller 18 are not meant to be limiting, and any type of software executed on a controller can perform the methods described herein without departing from the scope of this disclosure. For example, a controller, such as a processor executing software within a computing device, can perform the methods described herein.

Figure 3:
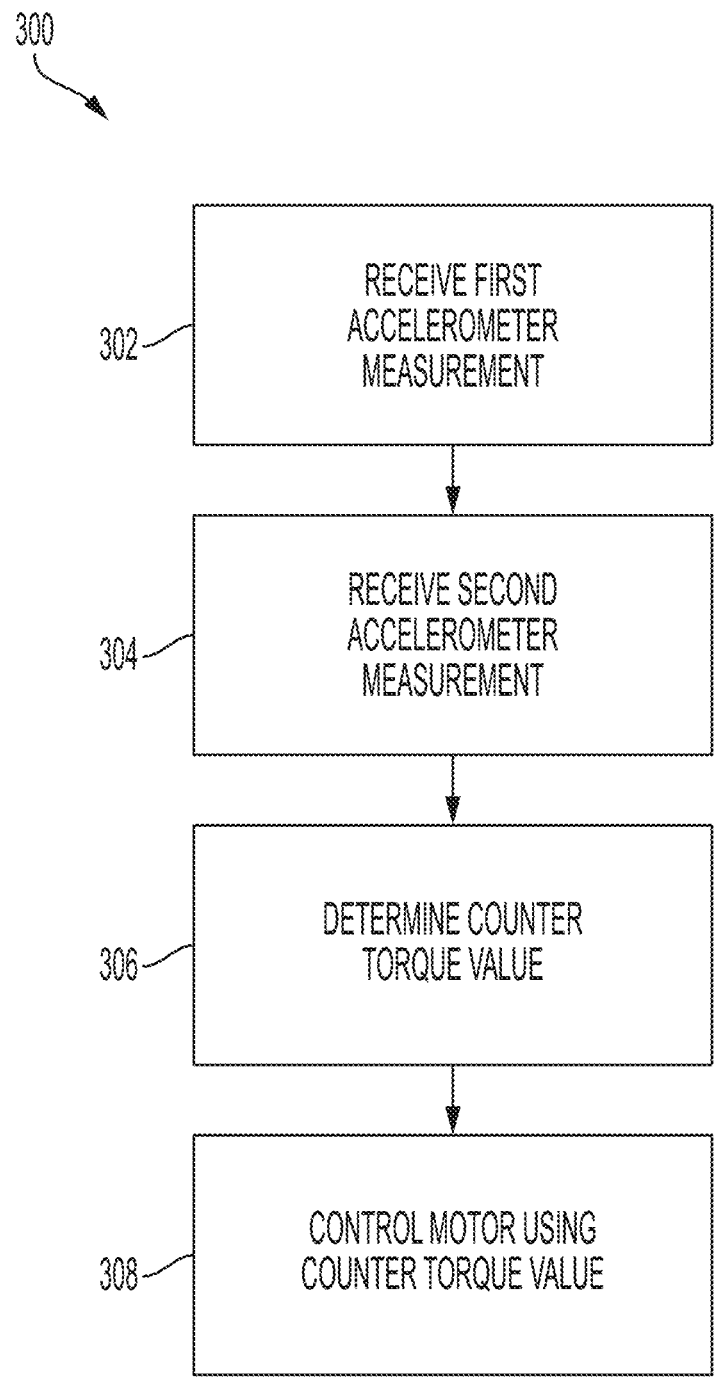
FIG. 3 is a flow diagram generally illustrating a seat vibration cancellation method according to the principles of the present disclosure.

FIG. 3 is a flow diagram generally illustrating a vibration cancellation method 300 according to the principles of the present disclosure. At 302, the method 300, receives a first accelerometer measurement. For example, the controller 18 may receive the first accelerometer measurement from one of the accelerometer 28 and the accelerometer 30. At 304, the method 300 receives a second accelerometer measurement. For example, the controller 18 may receive the second accelerometer measurement from the other of the accelerometer 28 and the accelerometer 30. At 306, the method 300 determines a counter torque value. For example, the controller 18 may determine the counter torque value based on the first accelerometer measurement and the second accelerometer measurement. In some embodiments, the controller 18 determines the counter torque value based on the motor position and the motor speed of the motor 16. In some embodiments, the controller 18 may determine a counter torque value based on the first accelerometer measurement and the second accelerometer measurement and may adjust the counter torque value based on the motor position and motor speed. In some embodiments, the controller 18 receives the operator preference, as described. The controller 18 may adjust the counter torque value or any determined torque value based on the operator preference. At 308, the method 300 controls the motor using the counter torque value. For example, the controller 18 controls the motor 16 using the counter torque value. As the motor 16 turns in response to the counter torque value, the gears of the gear box 20 actuate, which drives the lever arm 24 causing the link arm 22 to move. The movement of the link arm 22 drives the lift mechanism 26, which applies a force, corresponding to the counter torque value, on the seat top plate 12. The force applied on the seat top plate 12 may reduce or eliminate the perception by the operator of the vibrations acting on the seat.

In some embodiments, a system for cancelling seat vibration includes a motor in mechanical communication with a control arm. The system also includes a processor and a memory. The memory includes instructions that, when executed by the processor, cause the processor to: receive, from a first accelerometer, a first accelerometer measurement; receive, from a second accelerometer, a second accelerometer measurement; determine a counter torque value based on the first accelerometer measurement and the second accelerometer measurement; and selectively control the motor using the counter torque value.

In some embodiments, the motor includes a brushless servo motor. In some embodiments, the first accelerometer is disposed on a seat top plate. In some embodiments, the second accelerometer is disposed on a base mount plate. In some embodiments, the control arm is adapted to apply a force corresponding to the counter torque value on a seat top plate. In some embodiments, the instructions further cause the processor to selectively adjust the counter torque value based on an operator preference. In some embodiments, the operator preference corresponds to a desired ride style of an operator. In some embodiments, the instructions further cause the processor to determine a motor position and a motor speed of the motor and selectively adjust the counter torque value based on the motor position and the motor speed.

In some embodiments, a method for cancelling seat vibration includes receiving a first accelerometer measurement. The method also includes receiving a second accelerometer measurement. The method also includes determining a counter torque value based on the first accelerometer measurement and the second accelerometer measurement. The method also includes selectively controlling a motor using the counter torque value.

In some embodiments, the motor includes a brushless servo motor. In some embodiments, the first accelerometer measurement corresponds to a seat top plate. In some embodiments, the second accelerometer measurement corresponds a base mount plate. In some embodiments, the method also includes applying a force corresponding to the counter torque value on a seat top plate. In some embodiments, the method also includes selectively adjusting the counter torque value based on an operator preference. In some embodiments, the operator preference corresponds to a desired ride style of an operator. In some embodiments, the method also includes determining a motor position and a motor speed of the motor and selectively adjusting the counter torque value based on the motor position and the motor speed.

In some embodiments, a vehicle seat apparatus includes a brushless servo motor and a controller. The brushless servo motor is in mechanical communication with control arm, the control arm extends from a seat top plate to a base mount plate. The controller is configured to: receive, from a first accelerometer disposed on the seat top plate, a first accelerometer measurement; receive, from a second accelerometer disposed on the base mount plate, a second accelerometer measurement; determine a counter torque value based on the first accelerometer measurement and the second accelerometer measurement; and selectively control the brushless servo motor to apply a force corresponding to the counter torque value to the seat top plate using control arm.

In some embodiments, the controller is further configured to selectively adjust the counter torque value based on an operator preference. In some embodiments, the operator preference corresponds to a desired ride style of an operator. In some embodiments, the controller is further configured to determine a motor position and a motor speed of the brushless servo motor and selectively adjust the counter torque value based on the motor position and the motor speed.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A system for cancelling seat vibration, the system comprising:
   a motor in mechanical communication with a control arm;
   a processor; and
   a memory that includes vibration cancellation instructions that, when executed by the processor, cause the processor to:
      receive, from a first accelerometer, a first accelerometer measurement;
      receive, from a second accelerometer, a second accelerometer measurement;
      determine a counter torque value based on the first accelerometer measurement and the second accelerometer measurement; and
      selectively control the motor using the counter torque value.

2. The system of claim 1, wherein the motor includes a brushless servo motor.

3. The system of claim 1, wherein the first accelerometer is disposed on a seat top plate.

4. The system of claim 1, wherein the second accelerometer is disposed on a base mount plate.

5. The system of claim 1, wherein the control arm is adapted to apply a force corresponding to the counter torque value on a seat top plate.

6. The system of claim 1, wherein the vibration cancellation instructions further cause the processor to selectively adjust the counter torque value based on an operator preference.

7. The system of claim 6, wherein the operator preference corresponds to a desired ride style of an operator.

8. The system of claim 1, wherein the vibration cancellation instructions further cause the processor to:
   determine a motor position and a motor speed of the motor; and
   selectively adjust the counter torque value based on the motor position and the motor speed.

9. A vehicle seat apparatus comprising:
   a brushless servo motor in mechanical communication with control arm, the control arm extends from a seat top plate to a base mount plate;
   a controller that:
      receives, from a first accelerometer disposed on the seat top plate, a first accelerometer measurement;
      receives, from a second accelerometer disposed on the base mount plate, a second accelerometer measurement;
      determines a counter torque value based on the first accelerometer measurement and the second accelerometer measurement; and
      selectively controls the brushless servo motor to apply a force corresponding to the counter torque value to the seat top plate using control arm.

10. The vehicle seat apparatus of claim 9, wherein the controller further selectively adjusts the counter torque value based on an operator preference.

11. The vehicle seat apparatus of claim 10, wherein the operator preference corresponds to a desired ride style of an operator.

12. The vehicle seat apparatus of claim 9, wherein the controller further:
    determines a motor position and a motor speed of the brushless servo motor; and
    selectively adjusts the counter torque value based on the motor position and the motor speed.

* * * * *